(12) United States Patent
Moir et al.

(10) Patent No.: US 7,836,228 B1
(45) Date of Patent: Nov. 16, 2010

(54) SCALABLE AND LOCK-FREE FIRST-IN-FIRST-OUT QUEUE IMPLEMENTATION

(75) Inventors: Mark Moir, Hampton, NH (US); Ori Shalev, Givat-Shmuel (IL); Nir Shavit, Cambridge, MA (US)

(73) Assignee: Oracle America, Inc., Redwood City, CA (US)

( * ) Notice: Subject to any disclaimer, the term of this patent is extended or adjusted under 35 U.S.C. 154(b) by 1595 days.

(21) Appl. No.: 10/966,465

(22) Filed: Oct. 15, 2004

Related U.S. Application Data

(60) Provisional application No. 60/580,829, filed on Jun. 18, 2004.

(51) Int. Cl.
*G06F 3/00* (2006.01)

(52) U.S. Cl. .............. 710/52; 710/20; 710/21; 710/29; 710/33; 710/35; 710/36; 711/147; 719/311; 719/312; 719/313; 719/314

(58) Field of Classification Search .......... 719/311, 719/312, 313, 314; 711/147; 710/20, 21, 710/29, 33, 35, 36, 52
See application file for complete search history.

(56) References Cited

U.S. PATENT DOCUMENTS

| | | | |
|---|---|---|---|
| 4,584,640 A | 4/1986 | MacGregor et al. | |
| 4,847,754 A | 7/1989 | Obermarck et al. | |
| 5,224,215 A | 6/1993 | Disbrow | |
| 5,319,778 A | 6/1994 | Catino | |
| 5,428,761 A | 6/1995 | Herlihy et al. | |
| 6,128,710 A | 10/2000 | Greenspan et al. | |
| 6,144,965 A | 11/2000 | Olivier | |
| 6,178,423 B1 | 1/2001 | Douceur et al. | |
| 6,360,219 B1 | 3/2002 | Bretl et al. | |
| 6,360,220 B1 | 3/2002 | Forin | |
| 6,366,932 B1 | 4/2002 | Christenson | |
| 6,581,063 B1 | 6/2003 | Kirkman | |
| 6,651,146 B1 | 11/2003 | Srinivas et al. | |
| 6,826,757 B2 | 11/2004 | Steele, Jr. et al. | |
| 7,243,354 B1 * | 7/2007 | Chhabra et al. | 719/314 |
| 2001/0047361 A1 | 11/2001 | Martin et al. | |

(Continued)

FOREIGN PATENT DOCUMENTS

EP 0 366 585 5/1990

(Continued)

OTHER PUBLICATIONS

U.S. Appl. No. 09/547,288, filed Apr. 11, 2000 and naming as inventor(s) Shavit et al.

(Continued)

*Primary Examiner*—Tariq Hafiz
*Assistant Examiner*—Jasjit S Vidwan
(74) *Attorney, Agent, or Firm*—Robert C. Kowert; Meyertons, Hood, Kivlin, Kowert & Goetzel, P.C.

(57) ABSTRACT

A scalable first-in-first-out queue implementation adjusts to load on a host system. The scalable FIFO queue implementation is lock-free and linearizable, and scales to large numbers of threads. The FIFO queue implementation includes a central queue and an elimination structure for eliminating enqueue-dequeue operation pairs. The elimination mechanism tracks enqueue operations and/or dequeue operations and eliminates without synchronizing on the FIFO queue implementation.

61 Claims, 5 Drawing Sheets

U.S. PATENT DOCUMENTS

| | | | |
|---|---|---|---|
| 2003/0140085 A1 | 7/2003 | Moir et al. | |
| 2003/0174572 A1 | 9/2003 | Moir et al. | |
| 2003/0182462 A1 | 9/2003 | Moir et al. | |
| 2003/0182465 A1 | 9/2003 | Moir et al. | |
| 2004/0015510 A1 | 1/2004 | Moir et al. | |
| 2004/0015642 A1 | 1/2004 | Moir et al. | |
| 2004/0034673 A1 | 2/2004 | Moir et al. | |
| 2004/0034743 A1* | 2/2004 | Wolrich et al. | 711/132 |
| 2004/0153687 A1 | 8/2004 | Moir et al. | |
| 2004/0240444 A1* | 12/2004 | Matthews et al. | 370/389 |
| 2005/0240924 A1* | 10/2005 | Jones et al. | 718/100 |
| 2007/0165043 A1* | 7/2007 | Fouladi et al. | 345/558 |

FOREIGN PATENT DOCUMENTS

| | | |
|---|---|---|
| EP | 0 466 339 | 1/1992 |
| WO | WO 86/00434 | 1/1986 |
| WO | WO 01/53942 | 7/2001 |
| WO | WO 01/53943 | 7/2001 |
| WO | WO 01/80015 | 10/2001 |
| WO | WO 01/82057 | 11/2001 |
| WO | WO 03/060705 | 7/2003 |
| WO | WO 03/060715 | 7/2003 |

OTHER PUBLICATIONS

U.S. Appl. No. 09/547,290, filed Apr. 11, 2000 and naming as inventor(s) Shavit et al.
U.S. Appl. No. 09/710,218, filed Nov. 10, 2000 and naming as inventor(s) Harris, Timothy.
U.S. Appl. No. 10/653,828, filed Sep. 3, 2003 and naming as inventor(s) Martin et al.
U.S. Appl. No. 10/669,948, filed Sep. 24, 2003 and naming as inventor(s) Dice et al.
U.S. Appl. No. 10/670,495, filed Sep. 24, 2003 and naming as inventor(s) Shavit et al.
U.S. Appl. No. 10/894,828, filed Jul. 20, 2004 and naming as inventor(s) Moir et al.
U.S. Appl. No. 10/894,829, filed Jul. 20, 2004 and naming as inventor(s) Moir et al.
U.S. Appl. No. 10/915,502, filed Aug. 10, 2004 and naming as inventor(s) Moir, Mark.
Herlihy, M.P., "Wait-Free Synchronization," *ACM Transactions On Programming Languages and Systems*, 11(1):124-149, Jan. 1991.
Massalin, H., et al., "A Lock-Free Multiprocessor OS Kernel," Technical Report TR CUCS-005-9, Columbia University, New York, NY, 1991, 21 pages.
Massalin, Henry, "Synthesis: An Efficient Implementation of Fundamental Operating System Services," Dissertation submitted in partial fulfillment of the requirements for the Degree of Doctor of Philosophy in the Graduate School of Arts and Sciences, Columbia University, New York, NY, online, 158 pages, 1992 [retrieved from the Internet on Jul. 13, 2007: URL:ftp://ftp.cs.columbia.edu/reports/reports-1992/cucs-039-92.ps.gz].
Bershad, B. N., "Practical Considerations For Non-Blocking Concurrent Objects," *Proceedings 13th IEEE International Conference on Distributed Computing Systems*, pp. 264-273. IEEE Computer Society Press, Washington, D.C., 1993.
Herlihy, M., "A Methodology For Implementing Highly Concurrent Data Objects," *ACM Transactions on Programming Languages and Systems*, 15(5):745- 770, Nov. 1993.
Attiya, Hagit, et al., "Are Wait-Free Algorithms Fast?" *Journal of the ACM*, 41(4):725-763, Jul. 1994.
Lamarca, A., "A performance evaluation of lock-free synchronization protocols," *Proceedings of the 13th Annual ACM Symposium on Principles of Distributed Computing*, pp. 130-140, ACM Press, New York, NY, 1994.
Attiya, H., et al., "Universal Operations: Unary versus Binary," *Proceedings of the 15th Annual ACM Symposium on Principles of Distributed Computing*, pp. 223-232, ACM Press, New York, NY, 1996.
Greenwald, M. B., et al., "The Synergy Between Non-Blocking Synchronization and Operating System Structure," *Proceedings of the 2nd Symposium on Operating Systems Design and Implementation*, pp. 123-136, Usenix Association, Berkeley, CA, 1996.
Afek, Y., et al., "Disentangling Multi-Object Operations," *Proceedings of the 16th Annual ACM Symposium on Principles of Distributed Computing*, pp. 111-120, Aug. 1997. Santa Barbara, CA.
Attiya, Hagit, et al., "Atomic Snapshots in O(n log n) Operations," *SIAM Journal on Computing*, 27(2):319-340, Apr. 1998.
Greenwald, M., "Non-Blocking Synchronization and System Design," PhD thesis, Stanford University Technical Report STAN-CS-TR-99/1624, Palo Alto, CA, Aug. 1999, 241 pages.
Detlefs, David L., et al., "Even Better DCAS-Based Concurrent Deques," *Lecture Notes in Computer Science*, vol. 1914, pp. 59-73, Springer-Verlag, Berlin, Germany, ISBN: 3-540-41143-7, 2000.
Anderson, James H. et al., "Universal Constructions for Large Objects," *IEEE Transactions on Parallel and Distributed Systems*, vol. 10, No. 12, pp. 1317-1332, 1999.
Farook, Mohammad et al., "Managing Long Linked Lists Using Lock Free Techniques" in *High Performance Computing Systems and Applications, Chapter 37* (pp. 407-422), Kluwer Academic Publishers, Oct. 1998.
Herlihy, M., et al., "Transactional Memory: Architectural Support for Lock-Free Data Structures," *Proc. 20th International Symposium in Computer Architecture*, pp. 289-300, IEEE Computer Society, Washington, D.C., 1993.
Herlihy, Maurice et al., "The Repeat Offender Problem: A Mechanism for Supporting Dynamic-Sized Lock-Free Data Structures," Sun Microsystems Technical Report SMLI TR-2002-112, Jun. 2002.
Herlihy, Maurice et al., "Obstruction-Free Synchronization: Double-Ended Queues as an Example," *Proceedings of the 23rd International Conference on Distributed Computing*, p. 522, IEEE Computer Society, Washington, D.C., 2003.
Laden-Mozes, E., et al., "An Optimistic Approach to Lock-free FIFO Queues," *Lecture Notes in Computer Science*, vol. 3274, pp. 117-131, Springer-Verlag Berlin Heidelberg 2004.
Martin, Paul et al., "DCAS-Based Concurrent Deques Supporting Bulk Allocation," Sun Microsystems, Inc. Technical Report SMI TR-2002-111, Oct. 2002.
Michael, M., "Scalable Lock-Free Dynamic Memory Allocation," *Proceedings of the ACM SIGPLAN 2004 Conference on Programming Language Design and Implementation*, pp. 35-46, ACM Press, New York, NY, 2004.
Shann, Chien-Hua et al., "A Practical Nonblocking Queue Algorithm Using Compare-and Swap," *Proceedings of the Seventh International Conference on Parallel and Distributed Systems* p. 470, IEEE Computer Society, Washington, D.C., 2000.
Goetz, Brian, "A First Look at JSR 166: Concurrency Utilities," Mar. 1, 2004. [URL:http://today.java.net/lpt/a/76].
Dolev, Danny and Shavit, Nir, "Bounded Concurrent Time-Stamping," SIAM J. Comput., Apr. 1997, No. 2:418-455, vol. 26.
Goodman, James R. et al., "*Efficient Synchronization Primitives for Large-Scale Cache-Coherent Multiprocessors*," Proceedings Of The Third International Conference on Architectural Support for Programming Languages and Operating Systems, Apr. 3-6, 1989, pp. 64-75, ACM Press.
Gottleib, Allan, et al., "*Basic Techniques For The Efficient Coordination Of Very Large Numbers Of Cooperating Sequential Processors*," ACM Trans. Program. Lang. Syst., Apr. 1983, pp. 164-189, vol. 5, No. 2.
Hendler, Danny, et al., "*A Scalable Lock-Free Stack Algorithm*," Proceedings Of The 16th Annual ACM Symposium On Parallelism In Algorithms And Architectures, Jun. 27-30, 2004, pp. 205-215, ACM Press.
Herlihy, Maurice P. and Wing, Jeannette M., "*Linearizability: A Correctness Condition For Concurrent Objects*," ACM Transactions On Programming Languages And Systems, Jul. 1990, pp. 463-492, vol. 12, No. 3.
Herlihy, Maurice, et al., "*Dynamic-Sized Lock-Free Data Structures*," Proceedings of the 21st Annual Symposium on Principles of Distributed Computing, Jun. 2002, pp. 1-18.
Lea, Doug, "*The java.util.concurrent Synchronizer Framework*," Concurrency and Synchronization in Java Programs (CSJP '04), Jul. 26, 2004 pp. 1-9, St. John's, Newfoundland, Canada.

Michael, Maged M., and Scott, Michael L., "*Simple, Fast, and Practical Non-Blocking Concurrent Queue Algorithms*," Proceedings of the 15th Annual ACM Symposium on Principles of Distributed Computing (PODC '96), May 1996, pp. 267-275, New York, USA.

Moir, Mark, "*Practical Implementations Of Non-Blocking Synchronization Primitives*," Proceedings of the 16th Annual ACM Symposium on Principals of Distributed Computing, Aug. 1997, pp. 219-228.

Shavit, N. and Touitou, D., "*Elimination Trees and The Construction Of Pools and Stacks*," Theory of Computing Systems, vol. 30, pp. 645-670, 1997 (as previously seen in SPAA'95: 7th Annual ACM Symposium on Parallel Algorithms and Architectures, Jul. 1995, pp. 54-63, Santa Barbara, California. Also, Tel-Aviv University Technical Report, Jan. 1995).

Shavit, Nir and Zemach, Asaph, "*Combining Funnels: A new twist on an old tale...*," Proceedings of the 17th Annual ACM Symposium on Principals of Distributed Computing (PODC), Feb. 1, 1998, pp. 61-70, Santa Barbara.

Shavit, Nir and Zemach, Asaph, "*Combining Funnels: A Dynamic Approach To Software Combining*," [online] Jul. 6, 1999 [retrieved online on Apr. 29, 2005]. Retrieved from the Internet: <URL:http://www.cs.tau.ac.il/%7Eshanir/publications/publications.html>.

Trieber, R. Kent, "*Systems Programming: Coping with Parallelism*," IBM Technical Report RJ5118, Apr. 23, 1986, San Jose, CA.

Valois, John D., "*Lock-Free Linked Lists Using Compare-and-Swap*," Proceedings of the 14th Annual ACM Symposium on Principles of Distributed Computing, Aug. 1995, pp. 214-222.

Agesen, Ole, et al., "*DCAS-Based Concurrent Deques*," 12th Annual ACM Symposium on Parallel Algorithms and Architectures, Jul. 2000.

Arora, Nimar S., et al., "*Thread Scheduling for Multiprogrammed Multiprocessors*," Proceedings of the 10th Annual ACM Symposium on Parallel Algorithms and Architectures, Jul. 1998.

Herlihy, Maurice, and Moss, J. Eliot B., "*Transactional Memory: Architectural Support for Lock-Free Data Structures*," Annual International Symposium on Computer Architecture, May 1993.

* cited by examiner

SCALABLE AND LOCK-FREE FIRST-IN-FIRST-OUT QUEUE IMPLEMENTATION

CROSS-REFERENCE TO RELATED PATENT APPLICATION

This non-provisional patent application claims benefit under 35 U.S.C. §119(e) of U.S. Provisional Application No. 60/580,829, entitled "Lock-Free Shared Data Structures," naming as inventors Nir N. Shavit, Danny Hendler, and Lena Yerushalmi, filed Jun. 18, 2004. This non-provisional patent application is related to patent application Ser. No. 10/340,156 entitled "Value Recycling Facility for Multithreaded Computations," naming as inventors Mark S. Moir, Victor Luchango and Maurice Herlihy and filed on Jan. 10, 2003, which is incorporated herein by reference in its entirety.

BACKGROUND

1. Field of the Invention

The present invention relates to the field of computers. More specifically, the present invention relates to shared first-in-first-out data structures.

2. Description of the Related Art

A first-in-first-out (FIFO) queue supports an enqueue operation, which places a value at the end of the queue, and a dequeue operation, which removes the first value (if any) from the front of the queue. Concurrent FIFO queues are widely used in a variety of systems and applications. For example, queues are an essential building block of concurrent data structure libraries such as JSR-166, the Java® Concurrency Package described in *Concurrent Hash Map in JSR166 Concurrency Utilities* by D. Lea, which can be found online at gee.cs.oswego.edu/dl/concurrency-interest/index.html. It is therefore important to have robust concurrent queue implementations that perform well across a wide range of loads.

In recent years, good progress has been made towards practical lock-free FIFO queue implementations that avoid the numerous problems associated with traditional lock-based implementations. In particular, the lock-free FIFO queue implementation of Micheal and Scott described in *Simple, fast, and practical non-blocking and blocking concurrent queue algorithms* in *Proceedings of the 15th Annual ACM Symposium on Principles of Distributed Computing*, pages 219-228 (1996) (hereinafter referred to as MS-queue) outperforms previous concurrent FIFO queues across a wide variety of loads. A key reason is that the MS-queue algorithm allows enqueue and dequeue operations to complete without synchronizing with each other when the queue is nonempty. In contrast, many previous algorithms have the disadvantage that enqueue operations interfere with concurrent dequeue operations. Nonetheless, the MS-queue still requires concurrent enqueue operations to synchronize with each other, and similarly for concurrent dequeue operations. As a result, as the number of threads concurrently accessing the queue increases, the head and the tail of the queue become bottlenecks, and performance suffers. Therefore, while the MS-queue algorithm provides good performance on small-to-medium machines, it does not scale well to larger machines.

Although not previously available for FIFO queues, an elimination technique has been introduced for stacks by Shavit and Touitou as described in *Elimination trees and the construction of pools and stacks* in *Theory of Computing Systems*, 30:645-670 (1997). Their elimination technique is used to implement a scalable stack. A stack data structure supports a push operation, which adds a new element to the stack, and a pop operation, which removes and returns the most recently added element in the stack (if any). The elimination technique is based on the observation that if a push operation on a stack is immediately followed by a pop operation, then there is no net effect on the contents of a stack. Therefore, if a push and pop operation can somehow "pair up" the pop operation can return the element being added by the push operation, and both operations can return, without making any modification to the stack: we "pretend" that the two operations instantaneously pushed the value onto the stack and then popped it. The mechanism by which push and pop operations can pair up without synchronizing on centralized data allows exploitation of this observation.

Shavit and Touitou implement a stack that uses a tree-like structure that operations use to attempt to pair up and eliminate each other. The implementation is lock-free and scalable, but is not linearizable, which is discussed in *Linearizability: A Correctness Condition for Concurrent Objects* by M. Herlihy and J. Wing in *ACM Transaction on Programming Languages and Systems*, 12(3):462-492 (1990).

Shavit and Zemach introduced combining funnels in *Combining funnels: a dynamic approach to software combining, Journal of Parallel Distributed Computing*, 60(11):1355-1387 (2000), and used them to provide scalable stack implementations. Combining funnels employ both combining and elimination to achieve good scalability. They improve on elimination trees by being linearizable, but unfortunately they are blocking.

Both the elimination tree approach and the combining funnels approach are directed at scalability under high load, but their performance is substantially worse than other stack implementations under low loads. This is a significant disadvantage, as it is often difficult to predict load ahead of time. Indeed, load may be variable over the lifetime of a particular data structure, so we need data structures that are competitive under low load, and are scalable with increasing load.

Hendler, Shavit, and Yerushalmi introduced a scalable stack implementation in *A scalable lock-free stack algorithm, Proceedings of the 16th Annual ACM Symposium on Parallelism in Algorithms and Architectures*, pages 206-215, ACM Press (2004). Their scalable stack implementation performs well at low loads as well as being scalable under increasing load. Their implementation builds on a conventional (non-scalable) lock-free stack implementation. Such implementations typically use an optimistic style in which an operation succeeds if it does not encounter interference, and retries when it does. Since repeated retries on such stacks can lead to very poor performance, they are typically used with some form of backoff technique, in which operations wait for some time before retrying. However, as the load increases, the amount of backoff required to reduce contention increases. Thus, while backoff can improve performance, it does not achieve good scalability.

The stack implementation introduced by Hendler et al. includes a stack (the central stack) and a "collision array." In the implementation introduced by Hendler et al., operations first attempt to access the conventional stack, but in the case of interference, rather than simply waiting for some time, they attempt to find another operation to pair up with for elimination. To achieve good scalability, this pairing up must be achieved without synchronizing on any centralized data. Therefore, a push operation chooses a location at random in the collision array and attempts to "meet" a pop operation at that location. Under higher load, the probability of meeting an operation with which to eliminate is higher, and this is key to achieving good scalability. However, the implementation introduced by Hendler at al. does not satisfy the properties of a FIFO queue. Accordingly, a lock-free scalable implementation of a FIFO queue is desired.

SUMMARY

It has been discovered that a FIFO queue implementation that includes an elimination structure and that tracks enqueue order valuing allows a lock-free, linearizable, scalable FIFO queue. Enqueue and dequeue operations are allowed to "eliminate" each other without synchronizing on centralized data, thus avoiding bottlenecks that restrict scalability. The enqueue and dequeue operations dynamically determine whether to access the central queue of the FIFO queue or attempt elimination in accordance with a heuristic that corresponds to system load.

These and other aspects of the described invention will be better described with reference to the Description of the Embodiment(s) and accompanying Figures.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE EMBODIMENT(S)

Figure 1:
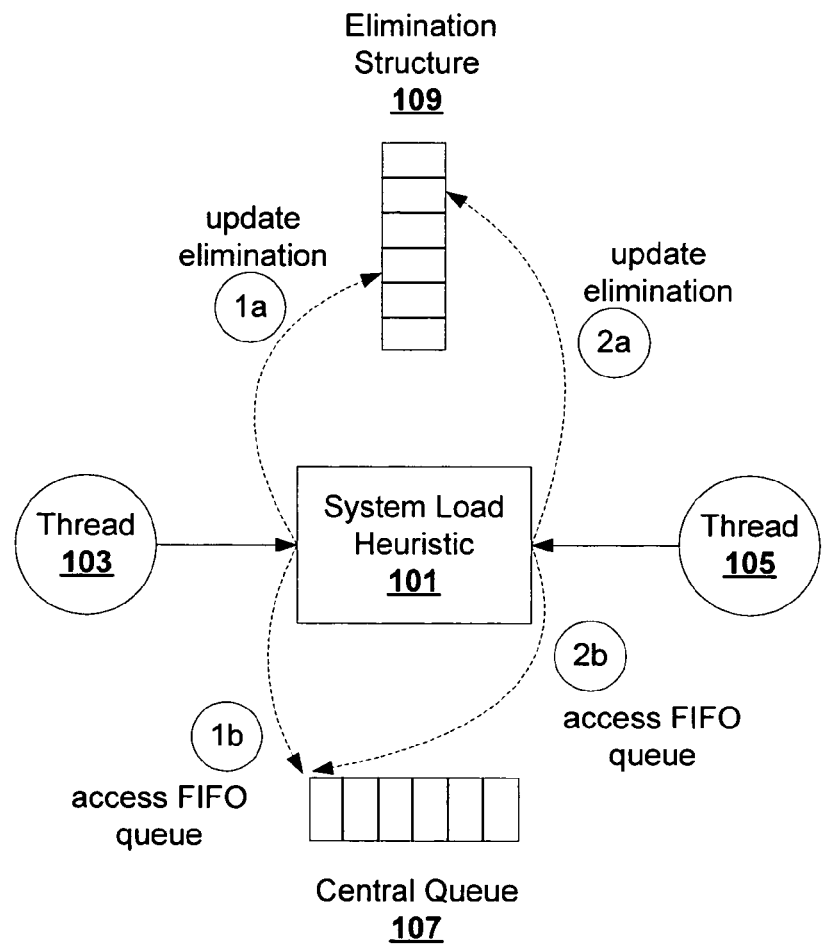
FIG. 1 depicts an exemplary implementation of a lock-free scalable FIFO queue with elimination.

The description that follows includes exemplary systems, methods, techniques, instruction sequences and computer program products that embody techniques of the present invention. However, it is understood that the described invention may be practiced without these specific details. For example, the described invention may utilize any of a variety of generic first-in-first-out queues as a central queue in the first-in-first-out queue implementation. For instance, the central queue described herein is illustrated with reference to the MS-queue, although the central queue may also be implemented in accordance with other queues such as that described in *An Optimistic Approach to Lock-free FIFO Queues* by Edya Ladan Moses and Nir N. Shavit in $18^{th}$ *International Conference on Distributed Computing*, LNCS 3274 Springer at pages 117-131 (2004). In other instances, well-known protocols, structures and techniques have not been shown in detail in order not to obscure the invention.

The standard correctness condition for concurrent data structures is linearizability. A linearizable implementation provides the illusion that each operation occurs atomically at a single point between the time it is called and the time it returns. This is a significant advantage because it allows programmers to use data structures in a modular way.

A lock-free data structure guarantees that after a finite number of steps of any operation, some operation completes. Blocking data structures based on locks do not provide this property because a thread that requires a lock that is already held by another thread can wait for an unbounded number of steps for the thread that holds the lock to release it. This is a significant problem in practice, for example if a thread is preempted while holding a lock.

A scalable first-in-first-out (FIFO) queue implementation is described herein that utilizes elimination techniques, such as those of Hendler et al, and includes a central queue (a central data structure to host enqueued values) and an elimination structure (e.g., a collision array). However, elimination for a FIFO queue implementation is substantially more difficult than for a stack, because any enqueue-dequeue operation pair cannot be simply eliminated in the same way as any push-pop pair in a stack. While a push followed by a pop on a stack has no net effect on the stack, the same is not true for a FIFO queue implementation. For example, if a FIFO central queue contains a single value a, and the following operations occur: enqueue b, dequeue b, enqueue c, then the enqueue-dequeue operation pair for b cannot simply be eliminated because a dequeue of b cannot occur before a dequeue of a. The dequeue of b cannot occur before the dequeue of a because the enqueue of a completed before the enqueue of b. Thus, to avoid states inconsistent with a FIFO queue, operation pairs cannot simply be eliminated. If the queue is empty, however, then any enqueue-dequeue pair can be eliminated. The lock-free scalable FIFO queue implementation takes advantage of this observation about an empty FIFO queue and also allows elimination of enqueue-dequeue operation pairs even if the queue is not empty, without sacrificing linearizability.

The ordering property of a FIFO queue implementation does not prohibit elimination, it only restricts it to particular combinations of operations. More specifically, if an enqueue operation and a dequeue operation successfully pair up, and at some point t at or after this pairing, there are several values in the queue, then we can "pretend" that the enqueue operation took effect just before the enqueue of the first value in the queue and that the dequeue takes effect at time t. For linearizability, this is valid if the point at which we linearize the eliminated enqueue operation (i.e., the point at which we pretend the eliminated enqueue operation takes effect) comes 1) after the enqueue operation is invoked, and 2) before it returns. The second requirement is relatively easy to satisfy because the eliminated enqueue operation returns after successful elimination. The first requirement provides challenges satisfied by the lock-free scalable FIFO queue implementation.

FIG. 1 depicts an exemplary implementation of a lock-free scalable FIFO queue with elimination. A first-in-first-out (FIFO) queue implementation includes a central queue 107 and an elimination structure 109. The central queue 107 is shared among threads 103 and 105, each of which is performing either an enqueue operation or a dequeue operation. The threads 103 and 105 dynamically determine whether to access the central queue 107 based on a system load heuristic 101. The depicted system load heuristic 101 is illustrated solely to aid in understanding the invention and may be a single instance of code representing the system load heuristic 101, multiple instances for each thread, etc. Based on the system load heuristic 107, the thread 103 either accesses the central queue 107 as indicated by a dashed line 1b, or updates an elimination structure 109 as indicated by a dashed line 1a. Likewise, the thread 105 either accesses the central queue 107 as indicated by a dashed line 2b or updates the elimination structure 109 as indicated by a dashed line 2a. In accordance with the system load heuristic 101, threads update the elimination structure 109 to attempt to eliminate more operations, during high system load, or access the central queue 107 to either enqueue or dequeue values during lower system loads.

A variety of approaches to laying out data and choosing locations for elimination in order to ensure good locality will be apparent to one skilled in the art. In large machines, good choices for layout and access patterns affect scalability.

The FIFO queue is implemented as lock-free, scalable, and linearizable. A scalable FIFO queue is built by using a FIFO queue implementation that is linearizable and lock-free, but not necessarily scalable, as a "central queue", and then using an elimination structure, such as a collision array, to allow enqueue-dequeue operation pairs to be eliminated only when it is correct to do so. Although various FIFO queue implementations can be used, the FIFO queue implementation described herein is based upon adaptation of the MS-queue implementation as the central queue due to its good properties under low load. The adaptation allows elimination of enqueue-dequeue operation pairs to determine when it is safe to eliminate.

A variety of mechanisms can be used to facilitate pairing of operations without synchronizing on central data (which would restrict scalability). Although various mechanisms are available, for simplicity, the described invention is described with reference to a collision array. In a simple collision array, threads pick random locations in order to try and collide. Pairs of threads that "collide" in some location use a lock-free synchronization protocol to attempt to agree that they can eliminate.

Figure 2:
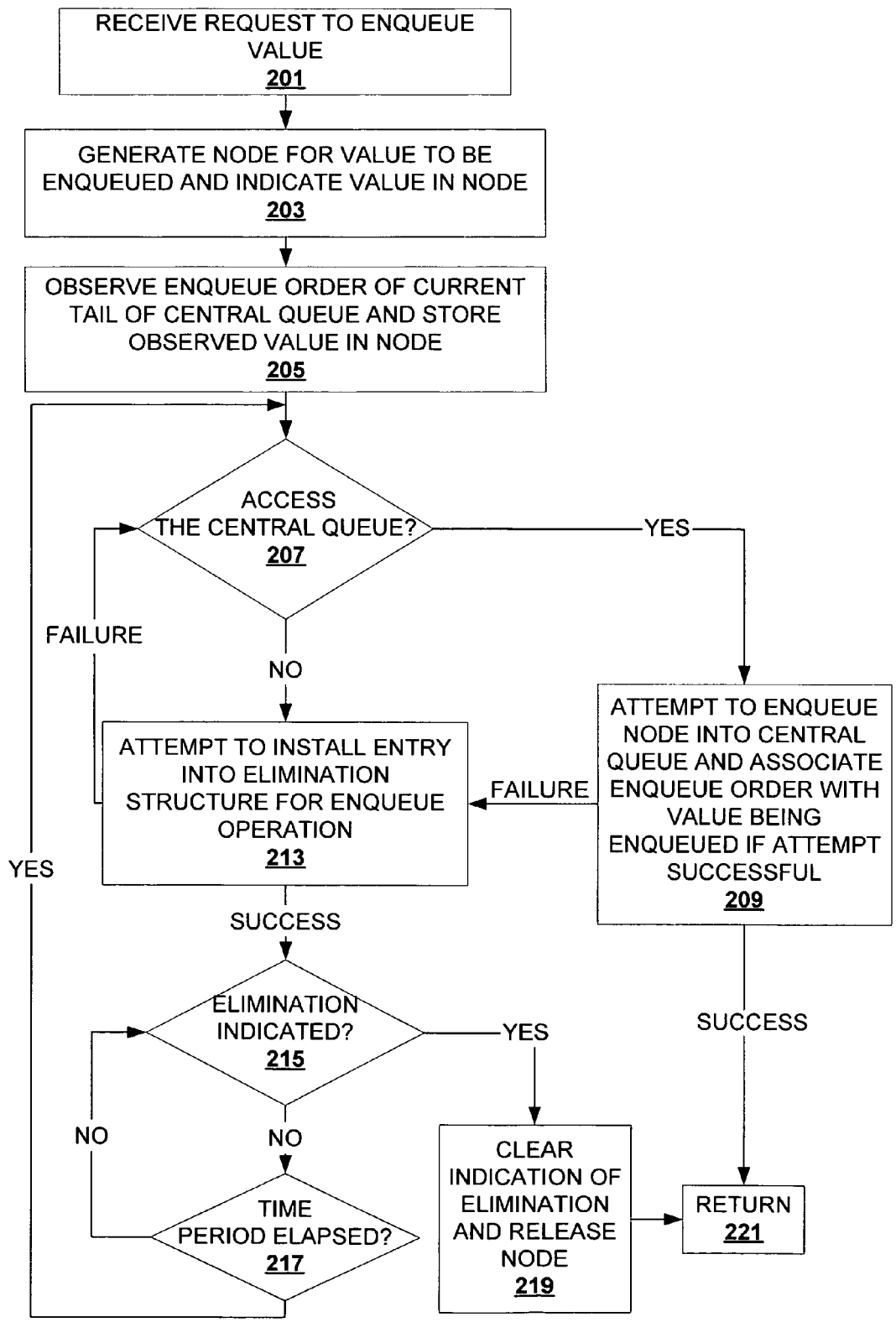
FIG. 2 depicts a flowchart for an enqueue operation on a lock-free scalable FIFO queue implementation.

FIG. 2 depicts a flowchart for an enqueue operation on a lock-free scalable FIFO queue implementation. At block 201, a request to enqueue a value is received. At block 203, a node is generated for the value to be enqueued, and the value is indicated in the generated node. At block 205, an enqueue order of a current tail of the central queue is observed and the observed enqueued order value is stored in the generated node. For example, the enqueue order value of the current tail node of the central queue is stored. At block 207, it is determined whether to access the central queue. If the central queue is to be accessed, the control flows to block 209. If the central queue is not to be accessed, then control flows to block 213.

At block 209, an attempt is made to enqueue the value. Attempting to enqueue the value includes attempting to enqueue the node into the central queue and associating an enqueue order value with the value being enqueued. For example, the enqueue operation uses the previously observed enqueue order value of the tail and associates an enqueue order value that is greater than the tail enqueue order value with the value to be enqueued by the enqueue operation. If the attempt fails, then control flows to block 213. If the attempt is successful, then control flows to block 221. At block 221, control returns to a calling computation (i.e., control returns to a procedure, function, or method that invoked the enqueue operation). Realizations of the described invention may return an indication of successful enqueue.

At block 213, elimination is attempted. Attempting elimination includes attempting to install an entry in the elimination structure for the enqueue operation. For example, an entry in a collision array is selected (e.g., randomly selected) and if the selected entry is empty, then the selected entry is updated to indicate the generated node (e.g., a pointer to the node is set). The collision array size can be adapted dynamically to maintain the right balance between ease of finding an empty slot for Enqueues and ease of finding a full slot for Dequeues. For example, a new collision array can be switched in at any time, allowing operations already using the old collision array to complete their attempts on the old collision array and use the new collision array next time. Memory management of the old arrays can be handled using existing memory management techniques such as those described in U.S. patent application Ser. No. 10/340,156 entitled "VALUE RECYCLING FACILITY FOR MULTI-THREADED COMPUTATIONS," naming as inventors Mark S. Moir, Victor Luchango and Maurice Herlihy and filed on Jan. 10, 2003, which is incorporated herein by reference in its entirety. If the elimination attempt fails, then control flows to block 207. If the entry is successfully installed into the elimination structure, then control flows to block 215.

At block 215, it is determined whether elimination is indicated. For example, the thread determines whether the installed entry indicates DONE. If elimination is indicated, then control flows to block 219. If elimination is not indicated then control flows to block 217.

At block 217, it is determined whether a given time period has elapsed. If the time period has not elapsed, then control flows back to block 215. If the time period has elapsed, then control flows back to block 207. Various realizations of the described invention utilize different techniques for deciding when to give up waiting for elimination. For example, a load based heuristic might contribute to this decision.

At block 219, the indication of elimination is cleared and the node released. For example, the installed entry is modified to indicate EMPTY. Control flows from block 219 to block 221. Realizations of the described invention may return an indication of the successful elimination, or return an indication of success, regardless of whether the enqueue operation was eliminated or the node was inserted into the central queue.

Figure 3:
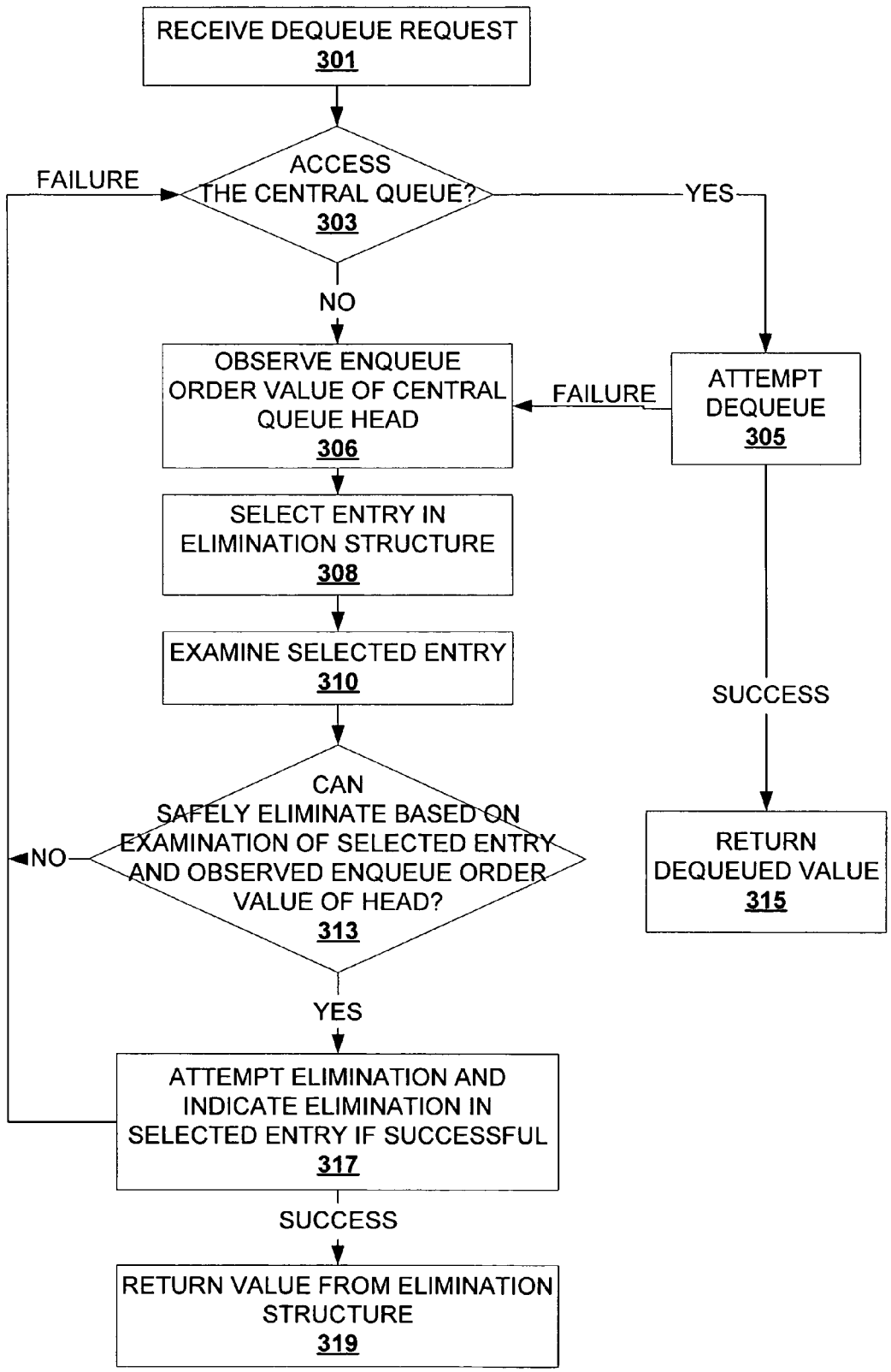
FIG. 3 depicts an exemplary flowchart for a dequeue operation on a lock-free scalable FIFO queue implementation.

FIG. 3 depicts an exemplary flowchart for a dequeue operation on a lock-free scalable FIFO queue implementation. At block 301, a dequeue request is received. At block 303, it is determined whether to access the central queue. If the central queue is to be accessed, then control flows to block 305. If the central queue is not to be accessed, then control flows to block 306.

At block 305, a dequeue attempt is made. If the dequeue attempt fails, then control flows to block 306. If the dequeue attempt is successful, then control flows to block 315. At block 315, the dequeued value is returned.

At block 306, the enqueue order value of the head node of the central queue is observed. At block 308, an entry in an elimination structure is selected (e.g., at random). At block 310, the selected entry is examined. For example, the entry is examined to determine the contents of the entry (e.g., whether the selected entry indicates EMPTY, DONE, or an enqueue operation). At block 313, it is determined whether it is safe to perform elimination based upon the examination of the selected entry and the observed enqueue order value of the central queue head. For example, the enqueue order value of the enqueue operation of the selected elimination entry is compared against the previously observed head enqueue order value. If it is not safe to perform elimination, then control flows back to block 303. If it is safe to perform elimination, then control flows to block 317. At block 317, an attempt is made to eliminate and elimination is indicated in the selected entry (e.g., with a DONE) if the elimination attempt is successful. Even if a corresponding enqueue operation is not in the elimination structure, or is not selected by the dequeue operation, then the elimination attempt can be an effective back-off technique. If the elimination attempt fails, then control flows back to block 303. If the elimination attempt is successful, then control flows to block 319. At block 319, the value from the selected elimination structure entry is returned. In addition, if the elimination is successful, the indication of the corresponding enqueue operation is cleared from the elimination structure.

In the described realizations of the elimination mechanism, an enqueue operation installs an entry in an elimination structure and a dequeue operation pairs up with an enqueue operation with the elimination structure for elimination of the pair of operations. However, realizations of the described invention may implement elimination differently. For example, dequeue operations may install entries in the elimination structure and enqueue operations perform the pairing and elimination, or either of enqueue or dequeue operations may install entries in the elimination structure while the counterpart operation pairs and eliminates.

While the flow diagram shows a particular order of operations performed by certain realizations of the invention, it should be understood that such order is exemplary (e.g., alternative realizations may perform the operations in a different order, combine certain operations, overlap certain operations, perform certain operations in parallel, etc.).

The following is exemplary code for an Enqueue operation that corresponds to the flowchart depicted in FIG. 2.

```
enqueue(Q: pointer to Queue_t, value: data type)
1:   uint seen_tail = PeekTail (Q)
2:   pnode_t node = new_node (value)
3:   loop
4:     if DecideWhetherToAccessQueue ( ) and EnqueueAttempt(Q,
          node) then
5:        return
6:     else
7:        if TryToEliminateEnqueue(Q, node, seen_tail) then
8:           free (node)
9:           return
10:       end if
11:    end if
12:  end loop
```

The next exemplary code is for a Dequeue operation that corresponds to the flowchart depicted in FIG. 3.

```
dequeue(Q: pointer to Queue_t, pvalue: pointer to data
                  type) :boolean
1:          loop
2:            if DecideWhetherToAccessQueue ( ) then
3:              res = DequeueAttempt (Q, pvalue)
4:              if res == success then
5:                return true
6:              else if res == QUEUE_EMPTY then
7:                return false
8:              end if
9:            else
10:             if TryToEliminateDequeue(Q, pvalue) then
11:               return true
12:             end if
13:           end if
14:           Backoff ( )
15:         end loop
```

The Enqueue operation begins by determining the enqueue order value of the last element in the central queue (if any). This is needed to determine when it is safe to eliminate this Enqueue operation with a Dequeue operation. The Enqueue operation then allocates a node initialized with the value to be enqueued, and then repeatedly attempts either to enqueue the value using the central queue, or to find a Dequeue operation with which to eliminate, depending on guidance from the heuristic implemented by DecideWhetherToAccessQueue.

Figure 4:
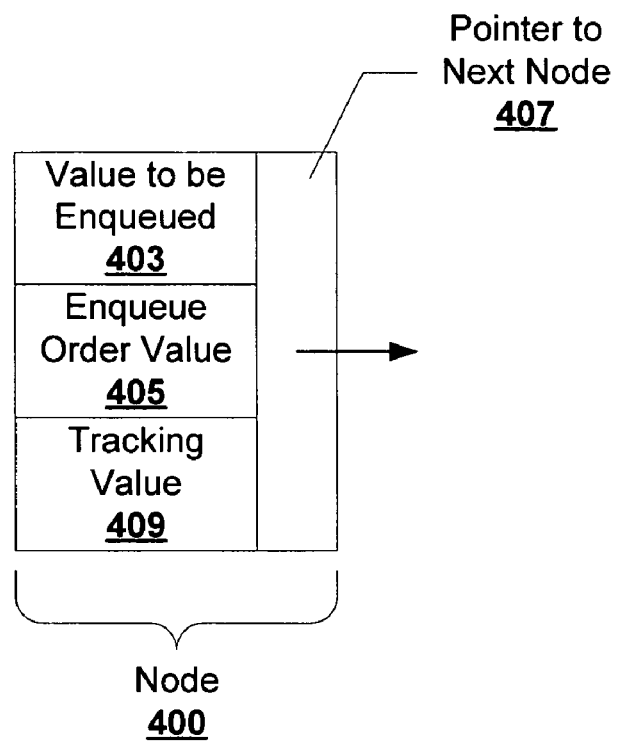
FIG. 4 depicts an exemplary node generated for enqueuing a value.

FIG. 4 depicts an exemplary node generated for enqueuing a value. A node 400 includes a value to be enqueued field 403, and enqueue order field 405, a tracking value field 409, and a pointer to next node field 407. The tracking value field 409 indicates a value that tracks information about the enqueue that is trying to eliminate (e.g., the enqueue order value of a previously enqueued value). In some realizations that utilize adaptations of the MS-queue, the node 400 serves two purposes. First, a reference to the node 400 is passed to EnqueueAttempt to communicate the value to be enqueued into the central queue. Depending on the central queue implementation, it may use the node in the central queue, and the node may include other fields not shown here or less fields. For example, the tracking value field 409 may be indicated elsewhere, such as with a data structure associated with the thread. The other purpose of the node 400 is for elimination. The value indicated in the value to be enqueued field 403 is the value to be passed from an eliminated enqueue operation to the corresponding eliminated dequeue operation, and the enqueue order value field 405 is used to determine when it is safe to eliminate an enqueue-dequeue operation pair. For the elimination, "special" values are assumed: "EMPTY" and "DONE", which can be distinguished from "real" pointers to nodes. The special values might be chosen to be values that cannot be node addresses (for example due to alignment assumptions), or two nodes can be allocated and associated with the special values. The node illustrated in FIG. 4 is exemplary and may be implemented differently. For example, a node may include the field 403 and another field to host the enqueue order value and the tracking value at different times (e.g., the field hosts the enqueue order value while the node is associated with an elimination structure and the tracking value while in the central queue).

Finally we note that, in order to avoid the ABA problem, pointers in the collision array could be stored together with version numbers, which are incremented each time a node is installed into the collision array. This avoids the following potential ABA problem. A Dequeue could read a pointer from the collision array and determine that the Enqueue is safe to eliminate. However, before the Dequeue performs its CAS to "claim" the value to return, the node could be removed from the collision array, recycled, and reused in the collision array by another Enqueue operation that is not yet safe to eliminate. The version numbers prevent this from occurring. Additional techniques, such as the bounded timestamps technique described in *Practical Implementations of Non-blocking Synchronization Primitives* in *Proceedings of the 16$^{th}$ Annual ACM Symposium on Principles of Distributed Computing*, pages 219-228 (1997) by Mark Moir, the memory management technique described in U.S. patent application Ser. No. 10/340,156 entitled "VALUE RECYCLING FACILITY FOR MULTITHREADED COMPUTATIONS," naming as inventors Mark S. Moir, Victor Luchango and Maurice Herlihy.

In the exemplary code, the central queue provides operations EnqueueAttempt and DequeueAttempt. These operations provide the same semantics as the standard enqueue and dequeue, except that they are allowed to return a special value indicating that they failed to complete their operation on the queue because of conflicts with other operations. The Enqueue operation returns when it succeeds using either enqueueing or eliminating. In the case that it succeeds by elimination, it frees the node it used to eliminate; otherwise, we assume that the central queue manages the node. The structure of a Dequeue operation is similar.

The Dequeue operation begins by determining whether to access the central queues with guidance from DecideWhetherToAccessQueue. If the Dequeue operation should access the central queue as guided by the heuristic, then it attempts to dequeue the value. Otherwise, the Dequeue operation attempts to eliminate a corresponding Enqueue operation.

An exemplary elimination mechanism is implemented with TryToEliminateEnqueue and TryToEliminateDequeue, exemplary code for which is indicated below.

---

TryToEliminateEnqueue (Q: pointer to Queue_t, node: pnode_t, seen_tail: uint): boolean

```
1:  node→seq = seen_tail;
2:  i = random(collision_array_size)
3:  (colnode, ver) = Q→Collisions [i]
4:  if colnode == EMPTY then
5:      if CAS(&Q→Collisions [i], (EMPTY, ver), (node, ver+1)) then
6:          ShortDelay ( )
7:          colnode = Q →Collisions [i].node
8:          if (colnode == DONE) or (not CAS (&Q→Collisions [i],
            (colnode, ver), (EMPTY, ver))) then
9:              Q→Collisions [i] =(EMPTY, ver)
10:             return true
11:         end if
12:     end if
13: end if
14: return false
```

---

TryToEliminateDequeue (Q: pointer to Queue_t, pvalue: pointer to data type) :boolean

```
1:  seen_head = PeekHead (Q)
2:  1 = random (collision_array_size)
3:  (node, ver) = Q→Collisions [i]
4:  if node does not include {EMPTY, DONE} then
5:      if node→seq < seen_head then
6:          *pvalue = node→value
7:          if CAS(&Q→Collisions[I], (node, ver), (DONE, ver)) then
8:              return true
9:          end if
10      end if
11: end if
12: return false
```

---

As presented, the enqueue procedure calls PeekHead and provides the results for use by TryToEliminateEnqueue. The TryToEliminateDequeue procedure calls PeekTail. The queue associates monotonically increasing "enqueue order values" with values enqueued. In addition, the PeekHead and PeekTail operations provide access to these enqueue order values. When the queue is not empty, PeekHead returns the enqueue order value of the element at the head of the queue (the next one to be dequeued), and PeekTail returns the enqueue order value of the element at the tail of the queue (the one most recently enqueued). If the queue is empty, these operations can return some value that can be distinguished from enqueue order values. For convenience, PeekTail can return 0 and PeekHead can return ∞ when the queue is empty, but other variations are possible. Using these special values avoids treating the empty queue as a special case.

If the central queue is implemented as an adaptation of the MS-queue, PeekHead and PeekTail are straightforward to implement. PeekHead reads the Head pointer, and then returns an enqueue order value from the node it points to, plus 1. Recall that the first node may be a dummy node, so the first element in the queue is the second node in the queue, which by construction has a enqueue order value that is 1 greater than the enqueue order value of the first node. PeekHead must also detect when the queue is empty, and return the associated special value. It can achieve this by reading the next pointer of the first node; if it is null, when the queue is empty. PeekHead also uses standard techniques to detect interference from concurrent operations in retry. Generally, this involves rereading the Head pointer to ensure that it did not change while the contents of the node were being read.

The PeekTail operation is similarly straightforward, with one exception. It reads the Tail pointer and returns the enqueue order value of the last node in the queue. However, recall that in the MS-queue algorithm, the tail can sometimes "lag" the end of the queue by one node, so PeekTail may have to perform the "helping" in the MS-queue algorithm in order to be sure that it obtains the enqueue order value of the most recently enqueued element. Also, PeekTail detects the queue being empty by reading both the head and the tail, and if they are the same, returning the appropriate special value to indicate emptiness. Standard lock-free techniques are used to detect interference from concurrent operations and retrial. Note that even if the DecideWhetherToAccessQueue heuristic always tells all threads not to access the central queue (because load is high, so we should encourage elimination, for example), the threads still invoke the PeekTail and PeekHead operations. Thus, care should be taken to ensure that frequent access to these operations does not impede performance. In realizations with MS-queue-based implementations, these operations are read-only, and therefore do not result in cache misses that would inhibit scalability.

TryToEliminateEnqueue stores the enqueue order value of the last element in the queue (determined from PeekTail) in seen_tail, and then attempts to find an empty slot in the collision array to use for a collision. It does this by choosing a slot at random, and then determining if the slot contains EMPTY. If not, the elimination attempt fails. Otherwise, the thread attempts to replace the EMPTY value with a pointer to its node using compare-and-swap (CAS). If this CAS fails, then the elimination attempt fails. Otherwise, the Enqueue has installed its node into the collision array, so it waits for a short time, hoping that a Dequeue that is attempting to eliminate finds the node and eliminates. If it does so, the Dequeue operation changes the node pointer to DONE, as explained below. Thus, when the Enqueue operation has finished waiting, it checks to see if the node pointer has been changed to DONE. If so, the operation has been eliminated, so it can return successfully. Otherwise, the thread uses CAS to attempt to change its entry in the collision array back to EMPTY, so that it can return to the main Enqueue procedure to retry. If this CAS fails, it can only be because a Dequeue operation has changed the node to DONE, so again the Enqueue is successfully eliminated in this case.

When a Dequeue operation attempts to eliminate, it chooses a slot in the collision array at random, and checks to see if there is an enqueue waiting to eliminate at that location (if the node pointer is not DONE or EMPTY, then there is an elimination attempt in progress by an Enqueue operation). If an Enqueue is not waiting at the selected slot, then the attempt to eliminate fails. Otherwise, the Dequeue can attempt to change the node pointer to DONE, indicating to that Enqueue operation that the elimination was successful. If the Dequeue operation successfully changes the node pointer to DONE, then it simply returns the value from the node. However, as discussed earlier, it is not always safe to eliminate with an Enqueue operation. The Dequeue operation that hopes to eliminate must first confirm that the enqueue order value associated with the element at the head of the central queue is greater than the enqueue order value that was associated with the element at the tail of the central queue when the candidate Enqueue operation began. This is necessary to ensure linearizability, because the eliminated Enqueue operation should be ordered immediately before the Enqueue operation that enqueued the element at the Head of the queue when the elimination occurs. To satisfy the conditions for linearizability, it ensures that the eliminated Enqueue operation has already been invoked by that point. If the eliminated Enqueue operation was not invoked before that point, then the elimination fails. A Dequeue operation seeking to eliminate might check multiple collision entries if it does not find an Enqueue operation with which to eliminate on its first attempt. In particular, once an entry has been checked, it is very cheap to also check other entries in the same cache line.

While realizations of the central queue have been described with reference to the MS-queue technique, various alternative queue implementations can be used. Generally, the FIFO queue implementation should be lock-free in the following sense: if some operation takes a sufficient number of steps, then some operation completes successfully (an EnqueueAttempt or DequeueAttempt is successful if it does not return the special failure value). Furthermore, the EnqueueAttempt and DequeueAttempt operations should be wait-free: they should complete (either successfully or not) in a bounded number of their own steps. These two characteristics prevent livelock on the central queue, and also allow intervention and use of the elimination in the case that an operation on the central queue does not complete successfully.

Adaptation of the MS-queue involves modification of EnqueueAttempt and DequeueAttempt operations. The EnqueueAttempt and DequeueAttempt operations are modified by taking one iteration of the retry loop in the corresponding operation of the MS-queue algorithm. Further, in order to facilitate the PeekHead and PeekTail operations, each successful EnqueueAttempt operation associates an enqueue order value with the enqueue value, as follows. Each enqueued node contains an enqueue order value, which is derived by adding 1 to the value in the node pointed to by tail immediately before the new node is installed. It is straightforward for one skilled in the art to make this adaptation. The MS-queue algorithm always contains at least 1 queue node, even when it is empty, so the enqueue order value of the most recently enqueued element is always available. Hence, the enqueue order value can be derived for a new element that is being enqueued.

Operations for the lock-free, scalable FIFO queue can be completed either by a successful attempt on the central queue, or by elimination. Under high load, elimination is preferable, because accessing the non-scalable central queue will result in poor performance. On the other hand, under low load, finding an eligible operation with which to eliminate may take too long, and because load is low, accessing the central queue should be fast. Linearizability can be achieved with an arbitrary mix of eliminated and noneliminated operations. Thus, a thread can choose dynamically between accessing the central queue and attempting to eliminate. In either case, if the attempt is unsuccessful, the other method can be tried. In the case of very low load, it may be necessary to access the central queue in order to complete an operation. A variety of strategies for attempting operations and adapting to load are possible. The scope of the described invention is not limited to a single strategy. Therefore, the exemplary code assumes a function DecideWhetherToAccessQueue, which returns true if an attempt should be made to complete the operation by accessing the central queue, and false if an attempt should be made to try to eliminate. This function can implement any heuristic choice of which method to attempt in each iteration. However, the following points should be noted:

The heuristic should be inexpensive to evaluate, and should not synchronize on centralized data.

The heuristic should always eventually attempt to complete on the central queue in order to ensure lock-freedom.

The heuristic should avoid attempting to complete operations on the central queue frequently under high load, as the non-scalable nature of the central queue will cause performance to degrade in this case.

A variety of possible heuristic approaches will be apparent to one skilled in the art. For example, one strategy is to simply use the elimination approach as a backoff strategy: whenever an attempt on the central queue fails, elimination is attempted for some time before retrying on the central queue.

The above described realizations assume unbounded enqueue order values. However, bounded enqueue order values, such as 64-bit enqueue order values, can be utilized without exhausting the enqueue order values in the lifetime of a typical system. Since nodes are not visible to other threads while they are being initialized, it is straightforward to implement lock-free counters of arbitrary length. Bounded timestamps can also be used, if applicable, because we only compare enqueue order values.

Similarly, version numbers are bounded and could in principle cause incorrect behavior. A variety of techniques for ensuring such behavior does not occur in practice are known in the literature, including a) using sufficient bits for the version number that wraparound cannot cause an error in practice, b) using bounded tags, and c) using memory management techniques to ensure that a node is not prematurely recycled in such a way that it can allow the ABA problem. While these other techniques (bounded tags, memory management) are useful for solving the ABA problem (as discussed above), they are not useful for ordered values, because they do not support a comparison operation.

The described invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other types of medium suitable for storing electronic instructions.

Figure 5:
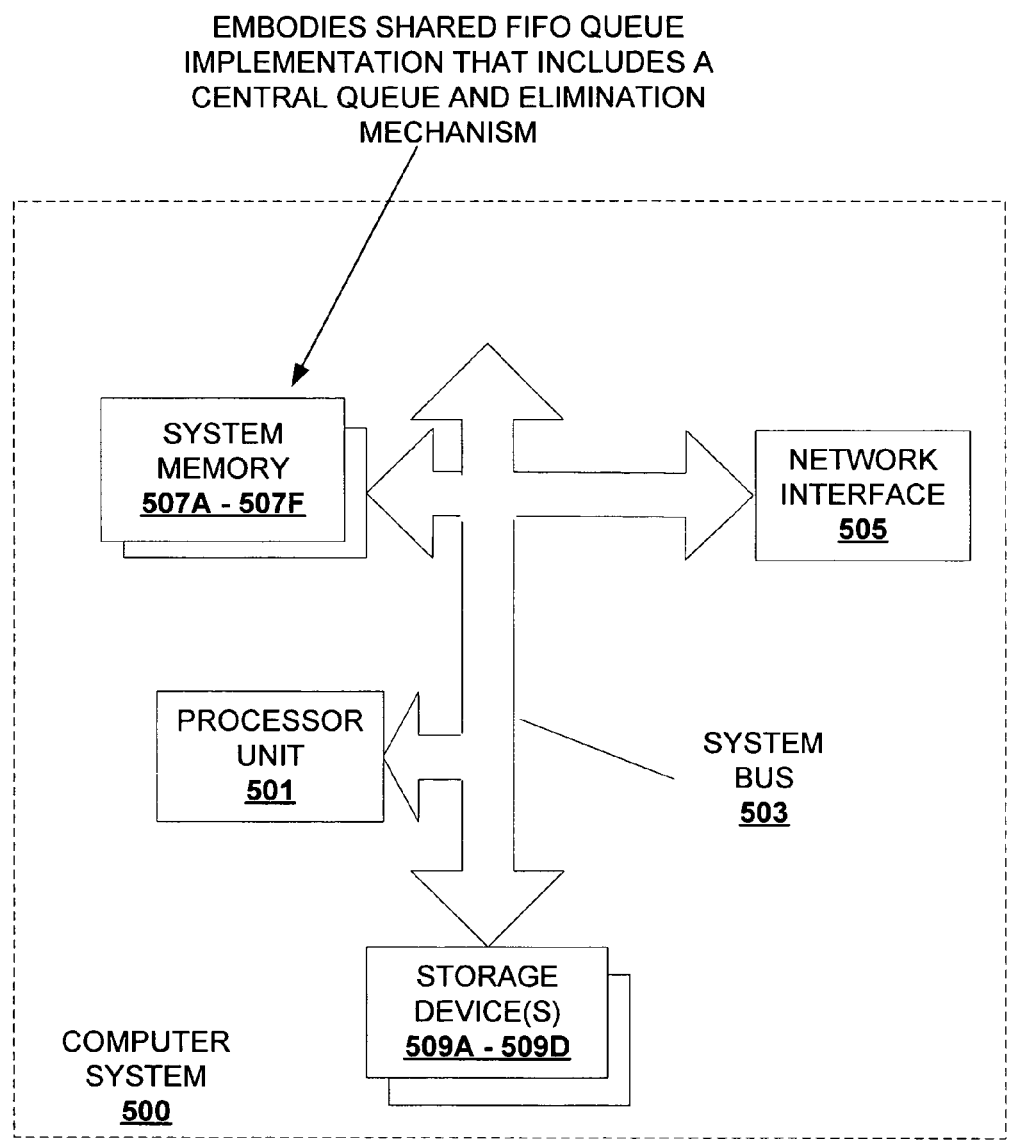
FIG. 5 depicts an exemplary computer system.

FIG. 5 depicts an exemplary computer system acc. A computer system 500 includes a processor unit 501 (possibly including multiple processors, a single threaded processor, a multi-threaded processor, a multi-core processor, etc.). The computer system 500 also includes a system memory 507A-507F (e.g., one or more of cache, SRAM DRAM, RDRAM, EDO RAM, DDR RAM, EEPROM, etc.), a system bus 503 (e.g., LDT, PCI, ISA, etc.), a network interface 505 (e.g., an ATM interface, an Ethernet interface, a Frame Relay interface, etc.), and a storage device(s) 509A-509D (e.g., optical storage, magnetic storage, etc.). Realizations of the invention may include fewer or additional components not illustrated in FIG. 5 (e.g., video cards, audio cards, additional network interfaces, peripheral devices, etc.). The processor unit 501, the storage device(s) 509A-509D, the network interface 505, and the system memory 507A-507F are coupled to the system bus 503. One or more of the system memories 507A-507F embody one or more shared FIFO queue implementations that include a central queue and an elimination mechanism.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. For example, the blocks and logic units identified in the description are for understanding the described invention and not meant to limit the described invention. Functionality may be separated or combined in blocks differently in various realizations of the invention or described with different terminology.

These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method, comprising:
   using a computer to perform:
   providing a shared first-in-first-out (FIFO) queue that includes a central queue and an elimination data structure, wherein the elimination data structure comprises one or more entries each indicating an enqueue or dequeue operation to attempt to eliminate as part of an enqueue-dequeue operation pair;
   receiving a request for an enqueue operation that would add an element to the FIFO queue or a dequeue operation that would remove an element from the FIFO queue;
   in response to said receiving, dynamically determining whether to allow access to the central queue to add an element to or remove an element from the central queue as specified by the request, or to attempt elimination of an enqueue-dequeue operation pair comprising the requested enqueue or dequeue operation, wherein attempting elimination comprises:
   updating one or more entries of the elimination data structure; and
   examining one or more entries of the elimination data structure in an attempt to locate a corresponding enqueue or dequeue operation with which to form the enqueue-dequeue operation pair;
   wherein said determining comprises determining whether the elimination would result in invalid behavior for the FIFO queue; and
   allowing access to the central queue or attempting elimination without accessing the central queue, dependent on results of said determining.

2. The method of claim 1, wherein said determining is dependent on a heuristic for adaptation to load on the system.

3. The method of claim 2, wherein the heuristic is inexpensive to evaluate and limits write access to a common location of the FIFO queue by concurrently executing operations.

4. The method of claim 2, wherein the heuristic eventually attempts to complete the requested enqueue or dequeue operation on the shared FIFO queue and ensures lock-freedom.

5. The method of claim 4, wherein the heuristic avoids frequent attempts to complete the requested enqueue or dequeue operation on the central queue when the load is high on the system.

6. The method of claim 2, wherein the heuristic causes elimination to be attempted in response to failure of an attempted access of the central queue.

7. The method of claim 6, further comprising using the computer to perform repeating said attempting elimination if the elimination does not succeed.

8. The method of claim 1, wherein said attempting elimination comprises:
   attempting to synchronize an enqueue operation and a dequeue operation indicated by entries of the elimination data structure to form an enqueue-dequeue operation pair for elimination.

9. The method of claim 8, wherein said forming an enqueue-dequeue operation pair comprises determining whether sufficient operations have been performed to allow elimination without violating behavior for the FIFO queue.

10. The method of claim 9, wherein said determining whether sufficient operations have been performed comprises comparing an enqueue order value of a head of the central queue with an enqueue order value of a previously observed tail of the central queue.

11. The method of claim 1, wherein said attempting elimination comprises:
   an enqueue operation indicating in a tracking data structure entry a first value to be enqueued and an enqueue order value for the first value with respect to a tail of the central queue; and
   a dequeue operation, which corresponds to the enqueue operation, selecting the tracking data structure entry and comparing the enqueue order value of the first value against an enqueue order value of a first element of the central queue to determine whether to allow elimination of the enqueue operation and the dequeue operation based, at least in part, on the comparison.

12. The method of claim 11, wherein the tracking data structure includes a collision array.

13. The method of claim 11, wherein the first element includes either a head of the central queue, or an element adjacent to the head of the central queue, the head element being a dummy element.

14. The method of claim 1, wherein said attempting elimination comprises:
   a dequeue operation installing an entry in the elimination data structure; and
   an enqueue operation selecting the entry installed by the dequeue operation and examining the installed entry to determine whether elimination of the dequeue operation and the enqueued operation is allowed.

15. The method of claim 1 further comprising:
   using the computer to perform determining whether the central queue is empty; and
   wherein said attempting elimination is performed in response to determining that the central queue is empty.

16. A computer-readable storage medium storing program instructions computer-executable to:
   instantiate a lock-free linearizable shared first-in-first-out (FIFO) queue in a shared memory, wherein the FIFO queue includes:
   a central queue; and an elimination data structure, wherein the elimination data structure comprises one or more entries each indicating an enqueue operation that would add an element to the FIFO queue or a dequeue operation that would remove an element from the FIFO queue; and form enqueue-dequeue operation pairs that can be eliminated without enqueueing or dequeueing elements from the central queue, wherein each pair comprises at least one entry of the elimination data structure.

17. The computer-readable storage medium of claim 16, wherein a first formed enqueue-dequeue operation pair does not modify variables modified by a second formed enqueue-dequeue operation pair in at least some circumstances.

18. The computer-readable storage medium of claim 17, wherein the at least some circumstances include the central queue being empty.

19. The computer-readable storage medium of claim 16, wherein each element of the central queue indicates a value that has been added to the central queue and an enqueue order value, wherein the enqueue order value corresponds to a tail element of the central queue.

20. The computer-readable storage medium of claim 16, wherein the program instructions are further computer-executable to implement, in response to receiving a request to enqueue or dequeue an element of the FIFO queue, dynamically determining whether to allow access to the central queue to add an element to or remove an element from the central queue as specified by the request, or to attempt elimination of an enqueue-dequeue operation pair.

21. The computer-readable storage medium of claim 20, wherein said dynamically determining comprises applying a heuristic that is dependent on load on a system that hosts the FIFO queue implementation.

22. The computer-readable storage medium of claim 20, wherein elimination is attempted only if the elimination does not cause the FIFO queue to behave invalidly.

23. A method, comprising:
using a computer to perform:
mediating concurrent access to a shared first-in-first-out (FIFO) queue, said mediating comprising:
in response to receiving a request for an enqueue operation that would add an element to the FIFO queue or a dequeue operation that would remove an element from the FIFO queue, determining whether sufficient operations exist for the shared FIFO queue to allow elimination of an enqueue-dequeue operation pair comprising the requested enqueue or dequeue operation; and
eliminating the enqueue-dequeue operation pair if the sufficient operations have been performed;
wherein said determining is dependent on contents of an elimination data structure that is included in the FIFO queue and that comprises one or more entries each indicating an enqueue or dequeue operation on the FIFO queue to attempt to eliminate as part of an enqueue-dequeue operation pair.

24. The method of claim 23, wherein said determining whether sufficient operations have been performed comprises:
a requested dequeue operation determining whether the corresponding enqueue operation is pending; and
the requested dequeue operation determining whether elimination of the enqueue-dequeue operation pair is consistent with expected behavior of the FIFO queue.

25. The method of claim 23, wherein said determining whether sufficient operations have been performed comprises:

a requested enqueue operation determining whether the corresponding dequeue operation is pending; and
the requested enqueue operation determining whether elimination of the enqueue-dequeue operation pair is consistent with expected behavior of the FIFO queue.

26. The method of claim 23, wherein the FIFO queue further includes:
a central queue for values to be enqueued therein and dequeued therefrom.

27. The method of claim 26, wherein elimination is allowed if the central queue is empty.

28. The method of claim 26, wherein each element of the central queue indicates a value that has been added to the central queue and an associated FIFO enqueue order value.

29. The method of claim 28, wherein the enqueue order value is relative to a tail of the central queue.

30. A method comprising:
using a computer to perform:
tracking enqueue and dequeue operations attempting to access a central queue of a shared first-in-first-out (FIFO) queue, wherein the FIFO queue also includes an elimination data structure, wherein the elimination data structure comprises one or more entries, and wherein each entry indicates an enqueue or dequeue operation to attempt to eliminate as part of an enqueue-dequeue operation pair;
determining whether elimination of an enqueue-dequeue operation pair comprising an enqueue operation attempting to add a given value to the FIFO queue and a dequeue operation attempting to remove the given value from the FIFO queue is allowable, wherein the elimination data structure comprises at least one operation of the enqueue-dequeue operation pair, and wherein said determining is dependent on the tracking; and
in response to determining that elimination is allowable, attempting elimination of the enqueue-dequeue operation pair, wherein said attempting elimination comprises updating one or more entries of the elimination data structure.

31. The method of claim 30, wherein the tracking comprises associating an enqueue order value with the given value that the enqueue operation is attempting to add to the FIFO queue.

32. The method of claim 30, wherein said determining comprises:
determining whether the enqueue operation and the dequeue operation are pending; and
determining if elimination of the enqueue-dequeue operation pair would be consistent with expected behavior of the FIFO queue.

33. The method of claim 32, wherein said determining if the elimination would be consistent with expected behavior of the FIFO queue comprises comparing the enqueue order value of a tail of the central queue that was previously observed by the enqueue operation with an enqueue order value of a first element of the central queue.

34. The method of claim 30, wherein access of the FIFO queue is linearizable.

35. The method of claim 30, wherein the FIFO queue is lock-free.

36. The method of claim 30, wherein the central queue of the FIFO queue is configured such that values are enqueued therein and dequeued therefrom.

37. The method of claim 36, further comprising:
using the computer to perform determining whether to access the central queue or to attempt to eliminate the enqueue-dequeue operation pair;
wherein said determining whether elimination is allowable is performed in response to determining that elimination should be attempted.

38. The method of claim 37, wherein said determining whether to access the central queue or to attempt to eliminate the enqueue-dequeue operation pair is dependent on a heuristic.

39. The method of claim 38, wherein the heuristic is dependent on a load on a system that hosts the FIFO queue.

40. The method of claim 30, further comprising using the computer to perform preventing ABA hazards using at least one of: bounded timestamps, value recycling, or version numbers.

41. A computer program product encoded on one or more machine-readable media, the computer program product comprising:
a first functional sequence executable to determine, in response to receiving a request for an enqueue operation that would add an element to a shared first-in-first-out (FIFO) or a dequeue operation that would remove an element from the FIFO queue, whether to access a central queue of the FIFO queue to add an element to or remove an element from the central queue as specified by the request, or to attempt elimination of an enqueue-dequeue operation pair comprising the requested enqueue or dequeue operation;
a second functional sequence executable to associate a first value with a second value, wherein the first value comprises a value to be enqueued, and wherein the second value is usable in determining whether elimination of the enqueue-dequeue operation pair is allowable; and
a third functional sequence executable to attempt elimination of the enqueue-dequeue operation pair in accordance with the determination by the first functional sequence;
wherein said determining is dependent on contents of an elimination data structure comprising one or more entries;
wherein each entry indicates an enqueue or dequeue operation on the FIFO queue to attempt to eliminate as part of an enqueue-dequeue operation pair; and
wherein attempting elimination comprises updating one or more entries of the elimination data structure.

42. The computer program product of claim 41, wherein the second functional sequence is executable to attempt to enqueue the first value in the central queue.

43. The computer program product of claim 42, wherein the third functional sequence is executed in response to the first functional sequence determining that elimination should be attempted elimination or the second functional sequence failing to enqueue the first value.

44. The computer program product of claim 41, wherein the first functional sequence determines whether to access the central queue dependent on a heuristic that corresponds to system load.

45. The computer program product of claim 41, wherein to attempt elimination of the enqueue-dequeue operation pair, the third functional sequence is executable to select an entry in the elimination data structure and to attempt to indicate the first and second values in the selected elimination data structure entry.

46. The computer program product of claim 45, wherein the attempt to indicate the first and second values fails if the selected entry is not empty.

47. The computer program product of claim 46, wherein an entry in the elimination data structure is indicated as empty if it contains a non-pointer special value.

48. The computer program product of claim 46, wherein indicating the first and second values comprises the third functional sequence storing, in the selected entry, a reference to a node that indicates the first and second values.

49. The computer program product of claim 41, further comprising a fourth functional sequence executable to attempt to dequeue the first value from the central queue.

50. The computer program product of claim 49, further comprising a fifth functional sequence executable to execute the first functional sequence, and to execute the fourth functional sequence if the first functional sequence determines that the FIFO queue should be accessed.

51. The computer program product of claim 50, further comprising a sixth functional sequence executable to attempt to eliminate the enqueue-dequeue operation pair if the first functional sequence determines that elimination should be attempted.

52. The computer program product of claim 51, wherein to attempt to eliminate the enqueue-dequeue operation pair, the sixth functional sequence is executable to determine whether sufficient operations have been performed to allow elimination.

53. The computer program product of claim 52, wherein said determining whether sufficient operations have been performed comprises:
determining whether the second value is less than a third value associated with a head of the central queue; and
if so, eliminating the attempted enqueue and dequeue of the first value.

54. The computer program product of claim 53, wherein the head of the central queue hosts the third value.

55. A system, comprising:
a computer-readable storage medium storing a set of one or more store elements operable to host a scalable lock-free first-in-first-out (FIFO) queue, wherein the FIFO queue includes a central queue and an elimination data structure, and wherein the elimination data structure comprises one or more entries each indicating an enqueue or dequeue operation to attempt to eliminate as part of an enqueue-dequeue operation pair; and
means for controlling access to the FIFO queue by linearizable enqueue operations that would add an element to the FIFO queue and dequeue operations that would remove an element from the FIFO queue dependent on load on the system, wherein said controlling access comprises determining whether to attempt to eliminate the linearizable operations in enqueue-dequeue operation pairs or to access the FIFO queue to add elements thereto or remove elements therefrom, in accordance with the system load; and
means for attempting elimination of enqueue-dequeue operations pairs, wherein attempting elimination comprises updating one or more entries of the elimination data structure.

56. The system of claim 55, wherein said controlling access is dependent on a heuristic.

57. The system of claim 55, further comprising means for tracking enqueue and dequeue operations for the central queue.

58. A computer readable storage medium storing program instructions computer-executable to implement:

a first-in-first-out (FIFO) queue, wherein the FIFO queue comprises:
   a central queue for values to be enqueued therein and dequeued therefrom, wherein each element of the central queue indicates a value that has been enqueued and an associated enqueue order value; and
   an elimination data structure comprising one or more entries to attempt to eliminate as part of an enqueue-dequeue operation pair, wherein each entry indicates an enqueue operation that would add an element to the FIFO queue or dequeue operation that would remove an element from the FIFO queue, and wherein attempting elimination comprises updating one or more entries of the elimination data structure.

59. The computer readable storage medium of claim 58, wherein the elimination data structure includes a collision array.

60. The computer readable storage medium of claim 58, wherein each element of the elimination data structure indicates a version for the indicated operation.

61. The computer readable storage medium of claim 58, wherein each element of the elimination data structure indicates a timestamp corresponding to the indicated operation.

\* \* \* \* \*